(12) United States Patent
Imai

(10) Patent No.: US 6,438,507 B1
(45) Date of Patent: Aug. 20, 2002

(54) DATA PROCESSING METHOD AND PROCESSING DEVICE

(75) Inventor: Shigeaki Imai, Uji (JP)

(73) Assignee: Minolta Co., Ltd., Osaka (JP)

( * ) Notice: Subject to any disclaimer, the term of this patent is extended or adjusted under 35 U.S.C. 154(b) by 206 days.

(21) Appl. No.: 09/584,179

(22) Filed: May 31, 2000

(30) Foreign Application Priority Data

May 31, 1999 (JP) ............................................. 11-151047

(51) Int. Cl.[7] .............................................. G01C 11/00
(52) U.S. Cl. ...................................... 702/150; 702/150
(58) Field of Search ..................... 364/474.24; 382/131, 382/284; 600/424; 702/36, 94, 95, 150

(56) References Cited

U.S. PATENT DOCUMENTS

| | | | |
|---|---|---|---|
| 5,531,520 A | * | 7/1996 | Grimson et al. ............. 382/131 |
| 5,715,166 A | * | 2/1998 | Besl et al. .............. 364/474.24 |
| 5,999,840 A | * | 12/1999 | Grimson et al. ............. 600/424 |
| 6,249,616 B1 | * | 6/2001 | Hashimoto ................. 382/284 |

FOREIGN PATENT DOCUMENTS

| | | |
|---|---|---|
| JP | 05303629 | 11/1993 |
| JP | 10002712 | 1/1998 |

OTHER PUBLICATIONS

Besl, P J; McKay, H D; "A Method Of Registration Of 3–D Shapes"; IEEE Transactions on Pattern Analysis and Machine Intelligence; vol. 1; 1 2; 1992; pp 239–256.*

Blinn, J F; "Inferring Transforms [Computer Graphics]"; IEEE Computer Graphics and Applications; vol. 19; 1 3; 1999; pp 93–98.*

Liu, Y; Rodrigues, M A; "A Two–Stage Approach To 3–D Scene Structural Analysis From A Single Dimensional Image"; Proceedings, Third International Conference on Computational Intelligence and Multimedia Applications; ICCIMA; 1999; pp 196–200.*

Tomii, T; Varga, S; Imai, S; Arisawa, H; "Design Of Video Scene Databases With Mapping To Virtual CG Space"; IEEE International Conference on Multimedia Computing and Systems; vol. 2; 1999; pp 741–746.*

* cited by examiner

*Primary Examiner*—John S. Hilten
*Assistant Examiner*—Douglas N Washburn
(74) *Attorney, Agent, or Firm*—Burns, Doane, Swecker & Mathis, LLP

(57) ABSTRACT

A method for accomplishing position alignment of two sets of three-dimensional data obtained by photographing an object from different directions, the method comprising a step of converting both sets or one set of two sets of three-dimensional data to a common coordinate system to accomplish approximate positional alignment, a step of projecting the two sets of three-dimensional data subjected to approximate positional alignment from a single common viewpoint onto a single common projection surface to generate two two-dimensional images, and a step of correcting positional dislocation of the two sets of three-dimensional data by evaluating the dislocation of the two two-dimensional images.

12 Claims, 4 Drawing Sheets

DATA PROCESSING METHOD AND PROCESSING DEVICE

This application is based on Patent Application No. HEI-11-151047 filed in Japan, the content of which is hereby incorporated by reference.

BACKGROUND OF THE INVENTION

1. Field of the Invention

The present invention relates to a method and device for aligning the position of data that expresses a three-dimensional shape obtained by photographing an object, and specifically relates to a method and device for high precision position alignment after approximate position alignment.

2. Description of the Related Art

An example of a conventional three-dimensional measuring device (three-dimensional data input or acquiring device) for capturing data expressing a three-dimensional shape (hereinafter referred to as "three-dimensional data") by photographing an object is disclosed in Japanese Laid-Open Patent Pubplication No. HEI 10-2712.

Using this three-dimensional measuring device it is possible to input three-dimensional data of an object rapidly and without contact. Furthermore, a two-dimensional image can be simultaneously obtained from the three-dimensional data by providing a shared optical system for obtaining the three-dimensional data and an optical system for obtaining the two-dimensional image (two-dimensional data).

Using such a three-dimensional measuring device, an object is photographed a plurality of times from relatively different directions or aspects to synthesize three-dimensional data of each obtained aspect so as to generate three-dimensional data to the entirety of the object. In order to synthesize a single three-dimensional data set by connecting adjoining three-dimensional data, the three-dimensional data of both sets must be positionally aligned.

A conversion matrix between the two sets of three-dimensional data must be determined to accomplish positional alignment of three-dimensional data. The conversion matrix can be determined from the correspondences between the two sets of three-dimensional data. Methods (1) and (2) below are methods for determining correspondences.

(1) Method for determining a conversion matrix from the geometric shape of an object An example of method (1) is the iterative closest point (ICP) disclosed in U.S. Pat. No. 5,715,166. According to this method, with the two sets of three-dimensional data in a state of approximate positional alignment, one three-dimensional data set is used as a standard and the point (closest neighbor point) on the other three-dimensional data set having the shortest distance from a point on the standard three-dimensional data set is determined as a correspondence point, and correspondence points are determined for each point of the standard three-dimensional data set. Then, the amount of movement is calculated when the sum of the distances to the neighbor points after moving the three-dimensional data is minimum.

(2) Method for determining a conversion matrix from texture information (two-dimensional image information) of an object An example of method (2) is disclosed in Japanese Laid-Open Patent Publication No. HEI 5-303629. According to this method, a two-dimensional image and three-dimensional data are resampled to achieve a one-to-one correspondence, so as to mutually match the resolution of two two-dimensional images in actual space. After resampling, correlation values are determine across the entire surface from both two-dimensional images, and mutually overlapping areas are extracted. The amount of movement needed to minimize the distance between the two sets of three-dimensional data is determined for the extracted overlapping areas.

Method (3) below is a method for achieving positional alignment without determining correspondence between three-dimensional data.

(3) Method for determining a conversion matrix by measuring position and posture of an object during photography Method (1) is a method for mapping sets of three-dimensional data based on features of shape such as edge and curvature of surfaces of an object. However, this method is unsuitable for objects which do not have major features of three-dimensional shape.

In method (2), for example, three-dimensional data are acquired and a two-dimensional image is photographed simultaneously, and mapping is accomplished using optical flow, a correlation method or the like on the two two-dimensional images. According to this method, mapping can be accomplished if there are texture characteristics (characteristics in two-dimensional image) even when the three-dimensional shape has no major feature. However, mapping requires searching all texture, with a resulting disadvantageous calculation cost. Furthermore, correspondence errors readily occur when there are numerous similar features in texture.

Method (3) mounts a position sensor and a posture sensor on the object or the three-dimensional measuring device, rotates the object via a turntable while the three-dimensional measuring device remains stationary, and determines a conversion matrix from the parameters between the device and the object. In this method, it is unnecessary to determine the association between three-dimensional data, but extremely high precision of each sensor, precision of rotational angle of the turntable, and precision of core deflection of rotational axis are required. Moreover, many limitations are imposed during use in order to maintain precision.

SUMMARY OF THE INVENTION

In view of the previously described disadvantages, an object of the present invention is to accomplish high precision positional alignment at low calculation cost by enabling high reliability mapping even when the shape of an object does not present major characteristics when approximate positional alignment of two sets of three-dimensional data has been accomplished beforehand.

One aspect of the present invention is a method for achieving positional alignment of two sets of three-dimensional data obtained by photographing an object from different directions, and is a data processing method comprising a step of converting both sets or one set of two sets of three-dimensional data to a common coordinate system to accomplish approximate positional alignment, a step of projecting the two sets of three-dimensional data subjected to approximate positional alignment from a single common viewpoint onto a single common projection surface to generate two two-dimensional images, and a step of correcting positional dislocation of the two sets of three-dimensional data by evaluating the dislocation of the two two-dimensional images.

Another aspect of the present invention is a method for achieving positional alignment of a first set of three-dimensional data and a second set of three-dimensional data obtained by photographing an object from different directions, and is a data processing method comprising a step of converting the second set of three-dimensional data to the coordinate system of the first set of three-dimensional data to accomplish approximate positional alignment, a step of projecting the second set of three-dimensional data subjected to approximate positional alignment from a single common viewpoint onto a single common projection surface to generate a projection two-dimensional image, and a step of correcting positional dislocation of the first set of three-dimensional data and the second set of three-dimensional data by evaluating the dislocation of the projection two-dimensional image and a first two-dimensional image corresponding to the first three-dimensional data.

The aforesaid evaluations are accomplished by a correlation method.

The aforesaid evaluations are accomplished using an optical flow.

Another aspect of the present invention is a method for evaluating the precision of positional alignment of two sets of three-dimensional data obtained by photographing an object from different directions, and is an evaluation method comprising a step of projecting the two sets of three-dimensional data from a single common viewpoint onto a single common projection surface to generate two two-dimensional images, and a step of evaluating the dislocation of the two two-dimensional images.

A still further aspect of the present invention is a device for achieving positional alignment of a first set of three-dimensional data and a second set of three-dimensional data obtained by photographing an object from different directions, and is a data processing device for prosecuting steps of converting the second set of three-dimensional data to the coordinate system of the first set of three-dimensional data to accomplish approximate positional alignment, projecting the second set of three-dimensional data subjected to approximate positional alignment from a single common viewpoint onto a single common projection surface to generate a projection two-dimensional image, evaluating dislocation of the projection two-dimensional image and a first two-dimensional image corresponding to the first set of three-dimensional data, and correcting positional dislocation of the first set of three-dimensional data and the second set of three-dimensional data based on the evaluation result.

In the step of projecting three-dimensional data from a common viewpoint onto a projection surface to generate two-dimensional images, the projection need not be actually carried out so long as the two-dimensional image is ultimately obtained. For example, when a two-dimensional image already exists from a certain viewpoint, that two-dimensional image may be used.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designed by like reference numbers throughout the several drawings.

DETAILED DESCRIPTION OF THE PREFERRED EMBODIMENTS

Figure 1:
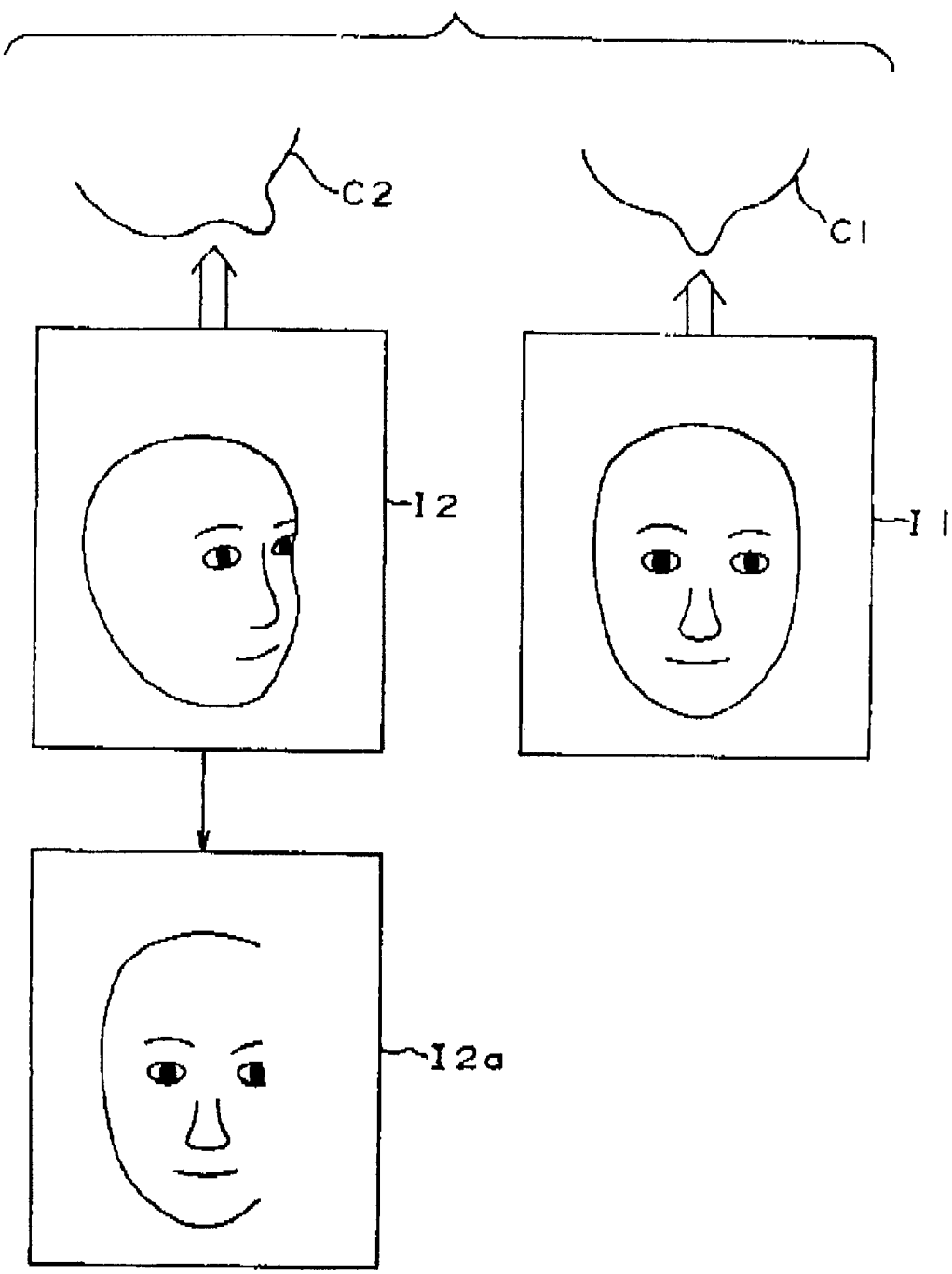
FIG. 1 shows the three-dimensional data and two-dimensional image for the positional alignment process.
Figure 2:
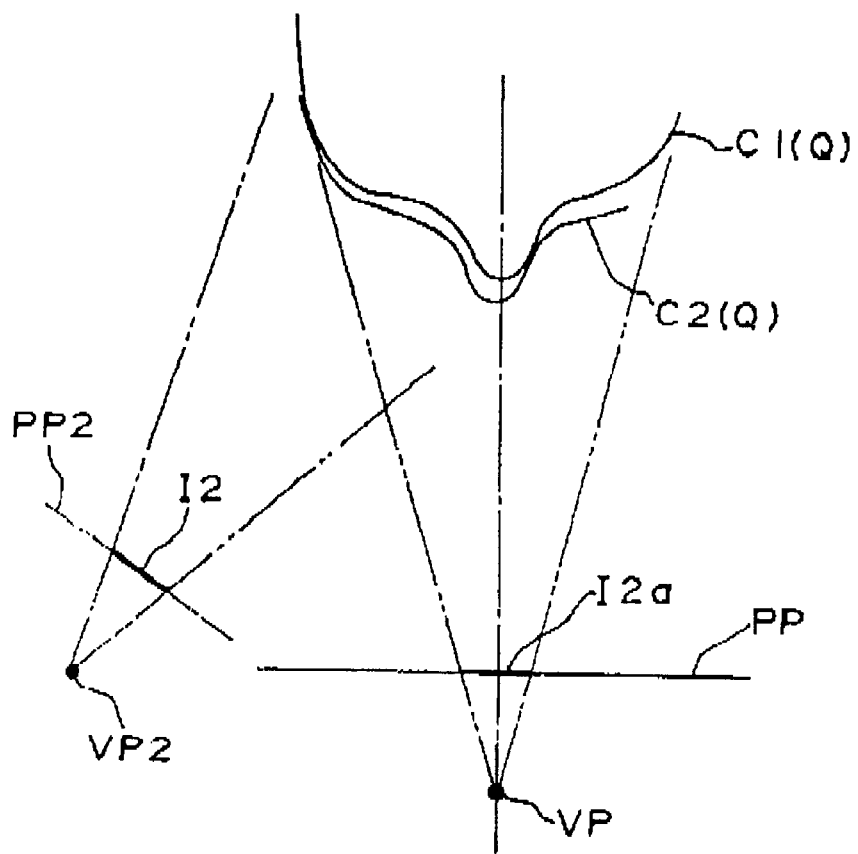
FIG. 2 shows the two-sets of three-dimensional data in a state of approximate positional alignment.
Figure 3:
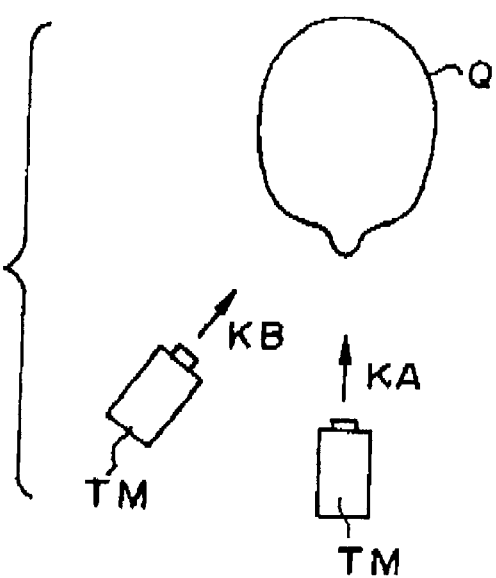
FIG. 3 shows the object photographing direction.
Figure 4:
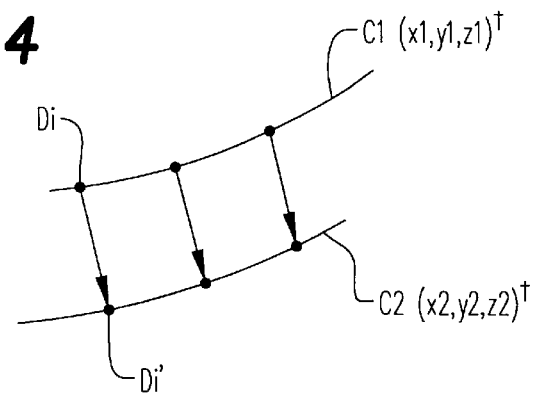
FIG. 4 illustrates the correspondence points of the two sets of three-dimensional data.

FIGS. 1–4 illustrate an embodiment of the present invention. Among these drawings, FIG. 1 shows two sets of three-dimensional data C1 and C2, and two-dimensional images I1, I2, I2a; FIG. 2 shows the two sets of three-dimensional data C1 and C2 in a state of approximate positional alignment; FIG. 3 shows the direction of photographing an object Q; and FIG. 4 illustrates correspondence points of the two sets of three-dimensional data C1 and C2.

As shown in FIG. 3, a single three-dimensional measuring device TM is used to photograph a single object Q from a plurality of directions KA and KB by moving the device TM. In this case the object Q is a human head, the direction KA is a direction facing the front of the face, and direction KB is a direction facing the right side of the face. The two sets of three-dimensional data C1 and C2 and the two two-dimensional images I1 and I2 are obtained by photographing from each direction KA and KB, as shown in FIG. 1.

The three-dimensional measuring device TM is provided, for example, with a well known camera capable of three-dimensional measurement using a slit light projection method (light-section method). The camera outputs both three-dimensional data C from each sampling point of the object Q, and two-dimensional image I of the object Q. In the optical system of the three-dimensional measuring device TM, the light centering from the surface of the object Q is split by a beam splitter, and the light of the wavelength range for three-dimensional measurement enters the image sensor used for measurement, and the light of the visible light range enters a color image sensor used for the monitor. The signals output from these image sensors are processed, and the three-dimensional data C and the two-dimensional image I are output. The two-dimensional image I is an image of the same angle of field as the three-dimensional data C.

The three-dimensional data C and the two-dimensional image I mutually correspond based on the optical parameters of the three-dimensional measuring device TM. That is, a single point on the three-dimensional data C is specified, and a corresponding point on the two-dimensional image I is determined. Conversely, a single point on the two-dimensional image I may be specified, and a corresponding point on the three-dimensional data C may be determined to similar effect.

A device, such as that disclosed, for example, in Japanese Laid-Open Patent No. HEI 10-2712 may be used as the three-dimensional measuring device. Three-dimensional measuring devices of other construction and methods also may be used.

In FIG. 1, the first and second three-dimensional data C1 and C2 are represented as only a single line. The first three-dimensional data C1 and the first two-dimensional image I1, and the second three-dimensional data C2 and the second two-dimensional image I2 mutually correspond.

In order to generate a single set of three-dimensional data by combining the two sets of three-dimensional data C1 and C2, the two sets of data must be precisely position aligned. An approximate position alignment is performed before precise position alignment.

Approximate position alignment may be accomplished using various well known methods. For example, position alignment may be accomplished using various well known three-dimensional data processing programs and moving the three-dimensional data C1 and C2 on the screen surface. Furthermore, position alignment may be accomplished by automatic calculations based on the image characteristics and shape of the three-dimensional data C1 and C2. Moreover, position alignment may be accomplished by automatic calculations based on parameters relating to posture and position during photography. In all of these methods, both or one of the two three-dimensional data C1 and C2 may be converted to a single common coordinate system. When the coordinate system of the three-dimensional data C1 is used as the common coordinate system, only the three-dimensional data C2 needs to be converted to that coordinate system.

In FIG. 2, there is still some positional dislocation although the two sets of three-dimensional data C1 and C2 have been subjected to approximate positional alignment. The three-dimensional data C1 were obtained by photographing the object Q from viewpoint VP, and the image projected on the projection surface PP is similar to the two-dimensional image I1. Similarly, the three-dimensional data C2 were obtained by photographing the object Q from the viewpoint VP2, the image projected on the projection surface PP2 is similar to the two-dimensional image I2.

In order to performed high precision positional alignment on the two sets of three-dimensional data C1 and C2, first, the image of the three-dimensional data C2 viewed from the viewpoint VP is projected on the projection surface PP. A two-dimensional image (projection two-dimensional image) I2a is formed on the projection surface PP.

This two-dimensional image I2a is an image of the three-dimensional data C2 viewed from the viewpoint VP of the three-dimensional data C1, as shown in FIG. 1. Since the image I2a corresponds to the three-dimensional data C2, part of the face is missing from the image. That is, the two-dimensional image I2a is obtained by changing the viewpoint of the three-dimensional data C2 from the original position viewpoint VP2 to the viewpoint VP common to the three-dimensional data C1.

These two-dimensional images I1 and I2a are views of the object Q from a common viewpoint VP, but are mutually different in accordance with the dislocation of the positions of the three-dimensional data C1 and C2. The positional dislocation of the three-dimensional data C1 and C2 is reflected in the mutual dislocation of the two-dimensional images I1 ands I2a. In other words, the mutual dislocation of the three-dimensional data C1 and C2 can be evaluated by evaluating the mutual dislocation of these two-dimensional images I1 and I2a.

Then, the dislocation between the two-dimensional image I1 and the two-dimensional image I2a is evaluated, the amount of movement to correct the three-dimensional data C2 is determined, and the positional dislocation of the two sets of three-dimensional data C1 and C2 is corrected.

A correlation method, optical flow method, and other methods may be applied when evaluating the dislocation of the two-dimensional image I1 and the two-dimensional image I2a.

In the correlation method, correlations between the two-dimensional image I1 and the two-dimensional image I2a are determined, and correspondence points are determined. Since the two two-dimensional images I1 and I2a are mutually similar, there is no need to determine correlations for the entire images, but rather it is sufficient to determine correlations only in the proximity of points of mutual correspondence. Accordingly, the calculations for determining correlations are greatly reduced, and processing speed is greatly improved.

Conventionally, because it is unknown how two images correspond, correlations must be determined for the entirety of the images, thereby markedly increasing the amount of calculation.

After determining the correspondence points, the three-dimensional data C2 are moved based on these correspondence points.

In the aforesaid method, since the viewpoint used to photograph the three-dimensional data C1 is used directly as the common viewpoint VP, the three-dimensional data C coordinate conversion and two-dimensional image generation may be performed for only one three-dimensional data C2. However, an optional position may be specified as the viewpoint VP, and two two-dimensional images I1a and I2a may be generated by projecting the two sets of three-dimensional data C1 and C2 as necessary.

The flow of the position alignment method is briefly described below using a flow chart.

Figure 5:
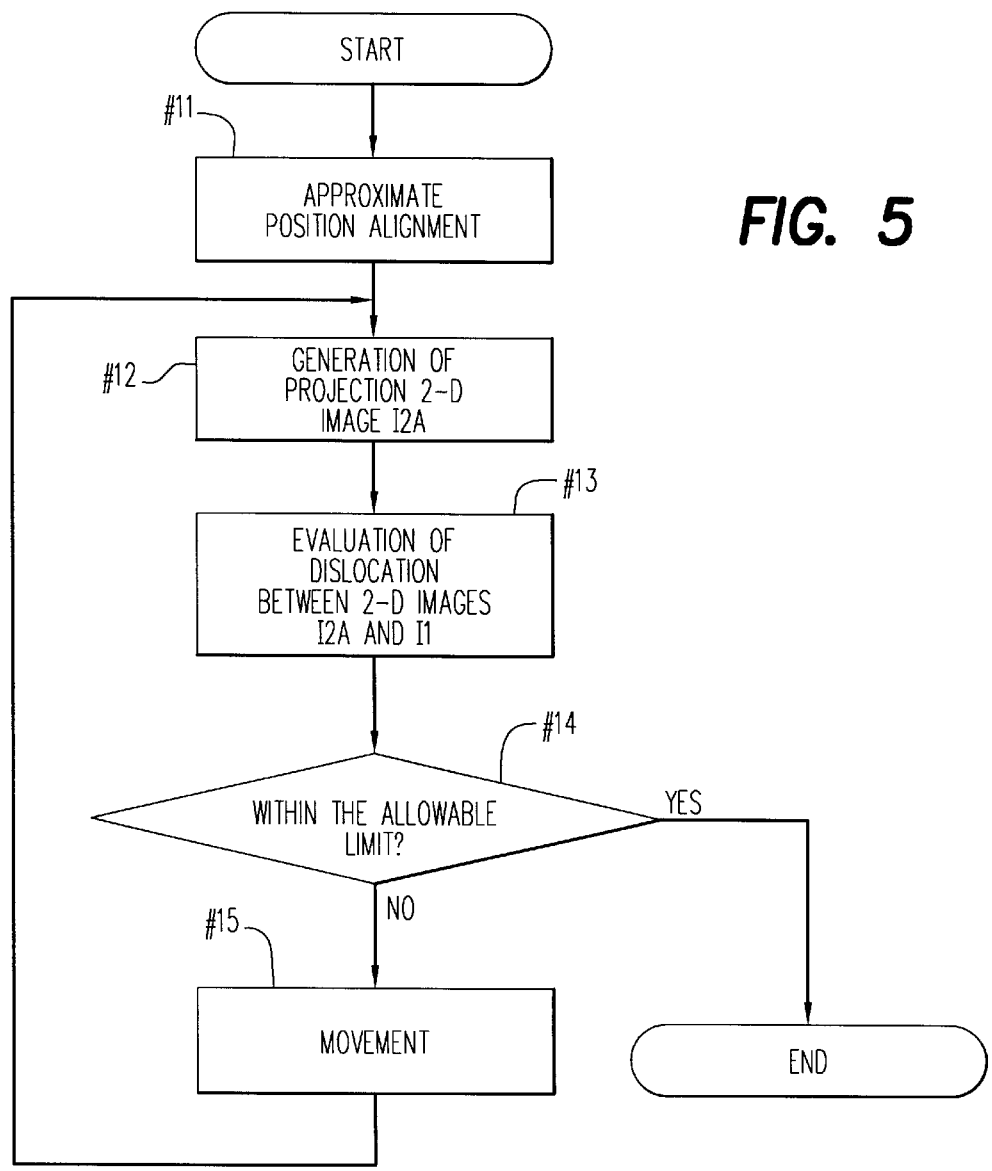
FIG. 5 is a flow chart briefly showing the positional alignment process.
Figure 6:
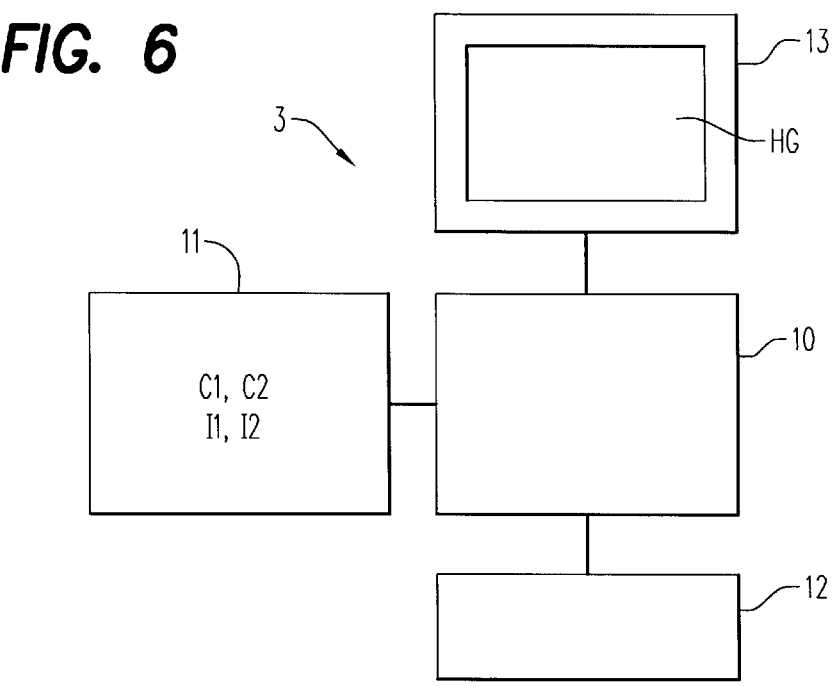
FIG. 6 is a block diagram showing the position alignment device.

FIG. 5 is a flow chart briefly showing the position alignment process, and FIG. 6 is a block diagram of a position alignment device 3 for executing the position alignment process.

In FIG. 5, first, approximate positional alignment of the two sets of three-dimensional data C1 and C2 is performed (#11). The three-dimensional data C2 are projected onto the projection surface PP from a common viewpoint VP to generate a two-dimensional image I2a (#12). The dislocation between the two-dimensional image I2a and the two-dimensional image I1 is evaluated (#13), and if the dislocation is within the allowable limit of error or acceptable error range (#14: YES), the process ends. If the dislocation is not within the allowable limit of error (#14: NO), the amount of movement is determined based on the evaluation (#15), and the process is repeated.

As shown in FIG. 6, the position alignment device 3 comprises a processor 10, memory 11, input device 12, and display 13. The three-dimensional data C1 and C2 and the two-dimensional images I1 and I2 are stored in the memory 11. The content of the memory 11 is transferred to the RAM of the processor 10, and subjected to suitable processing as previously described. The three-dimensional data C1 and C2, two-dimensional images I1 and I2, and the positional alignment conditions are displayed on the display surface HG of the display 13. The three-dimensional data C1 and C2 can be approximately position-aligned by operation from the input device 12.

This position alignment device 3 may be realized, for example, by a personal computer or workstation provided with suitable programs.

The position alignment method is described below by way of examples of the processes of each step.

Generation of Two-dimensional Image I2a

The two sets of three-dimensional data shown in FIGS. 1 and 2 are designated C1 $(X1, Y1, Z1)^t$ and C2 $(X2, Y2, Z2)^t$, and the two two-dimensional images are designated I1 $(U1, V1)^t$ and I2 $(U2, V2)^t$.

When the perspective conversion (transformation) matrix of the optical system of the three-dimensional measuring device TM is designated P and the conversion matrix to the camera coordinate system is designated M, the coordinate value I2a (U2a, V2a)$^t$ of the two-dimensional image I2a is determined by equation (1) below.

$$I2a(U_{2a}, V_{2a})^t = P \cdot M \cdot C2 \tag{1}$$

The conversion matrix M can be represented by M=T·R via the translation movement T and rotation R.

The value of the luminance data (density data) at each coordinate of the two-dimensional image I2a (U2a, V2a)$^t$ may be identical to that of the two-dimensional image I1 (U2, V2)$^t$.

The coordinates (U1, V1) and (U2, V2) of each point of the two-dimensional images I1 and I2 are normally discrete values of integers such as 0, 1, 2, 3 and the like corresponding to the coordinates of each pixel of the image sensor. However, since the two-dimensional image I2a is obtained by changing the viewpoint VP of the three-dimensional data C2, the spacing of the coordinates differs from the spacing of the coordinates of the two-dimensional images I1 and I2. Therefore, the coordinates of the two-dimensional image I2a and the coordinates of the two-dimensional image I2 do not have a 1-to-1 correspondence.

In order to obtain luminance data corresponding to the coordinates of the two-dimensional image I2a, the luminance data are interpolated based on the phase difference of the coordinates of the two-dimensional image I2. For example, a scan line algorithm or the like may be applied at this time. In this way, a smooth two-dimensional image I2a is generated.

Correspondence Point Detection via Correlation Method

Figure 7:
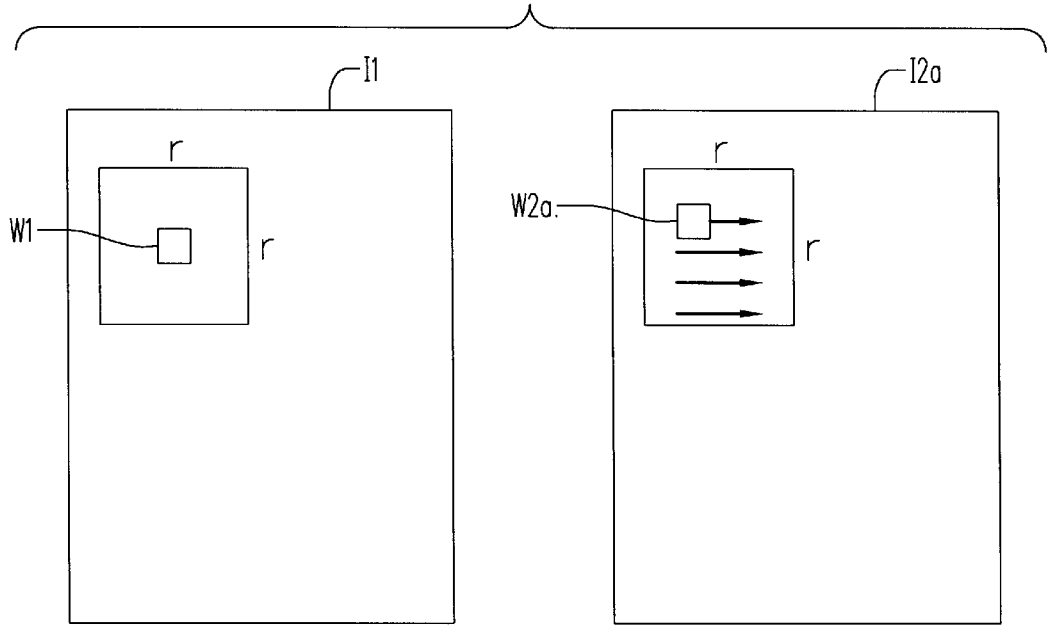
FIG. 7 illustrates a method for determining correlations of two two-dimensional images.

FIG. 7 illustrates a method for determining correlations between two two-dimensional images I1 and I2a.

As shown in FIG. 7, windows W1 and W2a of n×n pixels are set on the respective images of the two-dimensional image I1 and the two-dimensional image I2a, and the pixels positioned at the center of each window W1 and W2a are designated the target pixels.

When the coordinates of the target pixel in two-dimensional image I1 are designated (U1, V1), the coordinates (U2a, V2a) of the corresponding point on the two-dimensional image I2a may be considered in the range of equation (2).

$$(U_1 - r) \leq U_{2a} \leq (U_1 + r)$$
$$(V_1 - r) \leq V_{2a} \leq (V_1 + r) \tag{2}$$

In this case, r represents a predetermined search range determined from the weighted center position (center of gravity) of the three-dimensional data C1, and the maximum allowed value of the amount of dislocation for approximate positional alignment. For example, r may be determined by equation (3) below.

$$r = \|I_{2r}' - T_{2g}'\| \tag{3}$$

Where $I_{2g}' = P \cdot M \cdot C_{2g}$, $I_{2r}' = P \cdot M \cdot (C_{2g} + R)$, $C_{2g}$ represents the weighted center (center of gravity) of the three-dimensional data C2, and R represents the allowed limit of error (acceptable error range) vector.

The correlation value "cor" is determined as the window W2a is moved within the aforesaid range. When the luminance values (pixel value) of each pixel in the windows W1 and W2a are designated aij and bij, the correlation value cor is expressed by equation (4).

$$cor = \frac{\sum_{i=0}^{n-1} \sum_{j=0}^{n-1} (a_{ij} - \underline{a})(b_{ij} - \underline{b})}{n^2 \sigma_a \sigma_b} \tag{4}$$

Where $\underline{a}$ and $\underline{b}$ are average values of the respective pixel values. σa and σb are standard deviations of the respective pixel values.

The largest point of the correlation value cor is a correspondence point with the target pixel of the two-dimensional image I1. The target pixel on the two-dimensional image I1 is moved, and the aforesaid mapping is repeated.

The square error err expressed by equation (5) may be used in place of the correlation value cor.

$$err = \sum_{i=0}^{n-1} \sum_{j=0}^{n-1} (a_{ij} - b_{ij})^2 \tag{5}$$

In this case, the smallest point of the square error represents the correspondence points.

Calculating Amount of Movement

When the mapped pairs are designated Di (Xi,Yi,Zi,1) and Di' (Xi',Yi',Zi',1), D1 is expressed by equation (6) below.

$$Di = M \cdot Di' \tag{6}$$

The conversion matrix M is expressed by equation (7) below.

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{bmatrix} \tag{7}$$

When this matrix is developed, equation (8) is obtained.

$$X_0 = m_{11} x_0' + m_{12} y_0' + m_{13} z_0' + m_{14}$$
$$y_0 = m_{21} x_0' + m_{22} y_0' + m_{23} z_0' + m_{24}$$
$$Z_0 = m_{31} x_0' + m_{32} y_0' + m_{33} z_0' + m_{34} \ldots$$
$$X_{n-1} = m_{11} x_{n-1}' + m_{12} y_{n-1}' + m_{13} z_{n-1}' + m_{14}$$
$$y_{n-1} = m_{21} x_{n-1}' + m_{22} y_{n-1}' + m_{23} z_{n-1}' + m_{24}$$
$$z_{n-1} = m_{31} x_{n-1}' + m_{32} y_{n-1}' + m_{33} z_{n-1}' + m_{34} \tag{8}$$

Using the mapped pairs, simultaneous equations can be created, and solved by the least square method.

When the simultaneous equations are corrected to the format of the matrix, the following is derived.

$$B = QL$$
$$L = \{l_i\}, \; M = \{m_{ij}\}$$
$$m_{ij} = 14_{(i-1)+j}$$
$$B = (D_1, D_2, \ldots D_{n1})^t$$

$$Q = \begin{bmatrix} X_0 & Y_0 & Z_0 & 1 & 0 & 0 & 0 & 0 & 0 & 0 & 0 & 0 \\ 0 & 0 & 0 & 0 & X_0 & Y_0 & Z_0 & 1 & 0 & 0 & 0 & 0 \\ 0 & 0 & 0 & 0 & 0 & 0 & 0 & 0 & X_0 & Y_0 & Z_0 & 1 \\ \vdots & \vdots & \vdots & \vdots & \vdots & \vdots & \vdots & \vdots & \vdots & \vdots & \vdots & \vdots \\ X_{n-1} & Y_{n-1} & Z_{n-1} & 1 & 0 & 0 & 0 & 0 & 0 & 0 & 0 & 0 \\ 0 & 0 & 0 & 0 & X_{n-1} & Y_{n-1} & Z_{n-1} & 1 & 0 & 0 & 0 & 0 \\ 0 & 0 & 0 & 0 & 0 & 0 & 0 & 0 & X_{n-1} & Y_{n-1} & Z_{n-1} & 1 \end{bmatrix}$$

The least square solution determines the pseudo inverse matrix $Q^+$, to determine the following.

$$L = Q^+ B$$

Where $Q^+$ is a single value decomposition, and $Q^+ = P_2 \Sigma^+ P_1^t$ relative to $Q = P_1 \Sigma P_2$.

There are 12 unknown values, and since three equations can be formed by a single correspondence point, a solution can be obtained by four correspondence points which are not in the same plane.

Accordingly, the aforesaid mapping need not be performed for points or pixels on the entire image, inasmuch as it is sufficient to select several to several tens of characteristic points having high reliability for mapping.

An basic matrix (essential matrix) is determined from the correspondence between images, and a conversion matrix M can be determined from the essential matrix E.

Position Alignment Precision Evaluation Method

The similarities of the images can be evaluated between the two two-dimensional images I1 and I2a using the correlation values of the images and square error of each pixel value. For example, the optical flow is determined relative to the two-dimensional images I1 and I2a, and the total sum or the squared sum of the vector lengths are set as the evaluation value. When a correlation value is used as an evaluation value, the result is [1] when the values match. When a square error "err" is used as an evaluation value, the result is [0] when the values match.

According to the previously described embodiment, high reliability mapping can be accomplished at high speed after approximate position alignment of the two sets of three-dimensional data C1 and C2 even when the object Q lacks major features of shape. The position alignment method of the present embodiment allows the use of inexpensive three-dimensional measuring device TM, sensors and fixtures to measure the position and posture of an object Q, thereby reducing the overall cost.

In the previously described embodiment, the construction of the position alignment device, the sequence and content of the position alignment process, the approximate position alignment method, and the processing after high precision position alignment may be variously modified in accordance with the scope of the present invention.

According to the methods described above, when approximate position alignment between two sets of three-dimensional data is accomplished beforehand, high precision mapping can be accomplished at high speed even when the object lacks major features of shape, and high precision position alignment can be accomplished at a low calculation cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for achieving positional alignment of two sets of three-dimensional data comprising steps of:
   converting both sets or one set of two sets of three-dimensional data to a common coordinate system to accomplish approximate positional alignment;
   projecting the two sets of three-dimensional data subjected to approximate positional alignment from a single common viewpoint onto a single common projection surface to generate two two-dimensional images; and
   correcting positional dislocation of the two sets of three-dimensional data by evaluating the dislocation of the two two-dimensional images.

2. A method according to claim 1, wherein the evaluation is accomplished by a correlation method.

3. A method according to claim 1, wherein the evaluation of accomplished using an optical flow.

4. A method for achieving positional alignment of a first set of three-dimensional data and a second set of three-dimensional data comprising steps of:
   converting the second set of three-dimensional data to the coordinate system of the first set of three-dimensional data to accomplish approximate positional alignment;
   projecting the second set of three-dimensional data subjected to approximate positional alignment from a single common viewpoint onto a single common projection surface to generate a projection two-dimensional image; and
   correcting positional dislocation of the first set of three-dimensional data and the second set of three-dimensional data by evaluating the dislocation of the projection two-dimensional image and a first two-dimensional image corresponding to the first three-dimensional data.

5. A method according to claim 4, wherein the evaluation is accomplished by a correlation method.

6. A method according to claim 4, wherein the evaluation is accomplished using an optical flow.

7. A method for evaluating the precision of positional alignment of two sets of three-dimensional data comprising:
   projecting the two sets of three-dimensional data from a single common viewpoint onto a single common projection surface to generate two two-dimensional images; and
   evaluating the dislocation of the two two-dimensional images.

8. A position alignment device for achieving positional alignment of a first set of three-dimensional data and a second set of three-dimensional data, said device prosecutes steps of
   converting the second set of three-dimensional data to the coordinate system of the first set of three-dimensional data to accomplish approximate positional alignment;
   projecting the second set of three-dimensional data subjected to approximate positional alignment from a single common viewpoint onto a single common projection surface to generate a projection two-dimensional image;
   evaluating dislocation of the projection two-dimensional image and a first two-dimensional image corresponding to the first set of three-dimensional data; and correcting positional dislocation of the first set of three-dimensional data and the second set of three-dimensional data based on the evaluation result.

9. A computer program product for prosecuting the method according to claim 1 by a data processor.

10. A computer program product for prosecuting the method according to claim 4 by a data processor.

11. A computer program product for prosecuting the method according to claim 7 by a data processor.

12. A computer program product which is to be prosecuted by the position alignment device according to claim 8.

* * * * *